US008628404B2

(12) United States Patent
Harris et al.

(10) Patent No.: US 8,628,404 B2
(45) Date of Patent: Jan. 14, 2014

(54) METHOD AND APPARATUS FOR AWARDING WINS FOR GAME PLAY

(75) Inventors: Ronnie W. Harris, Grove, OK (US); Ted Grav, Vancouver (CN)

(73) Assignee: Rocket Gaming Systems, LLC, Las Vegas, NV (US)

( * ) Notice: Subject to any disclaimer, the term of this patent is extended or adjusted under 35 U.S.C. 154(b) by 1973 days.

(21) Appl. No.: 10/892,692

(22) Filed: Jul. 16, 2004

(65) Prior Publication Data

US 2006/0014582 A1 Jan. 19, 2006

(51) Int. Cl.
*A63F 9/24* (2006.01)
*G06F 19/00* (2011.01)

(52) U.S. Cl.
USPC .................................. 463/25; 463/16; 463/40

(58) Field of Classification Search
USPC ....................... 463/16–21, 25–27, 19, 42, 40; 273/138.1, 269, 459–461
See application file for complete search history.

(56) References Cited

U.S. PATENT DOCUMENTS 4,527,798 A * 7/1985 Siekierski et al. .............. 463/17
5,113,990 A 5/1992 Gabrius et al.
5,816,918 A 10/1998 Kelly et al.
6,113,492 A * 9/2000 Walker et al. .................... 463/16
6,213,877 B1 4/2001 Walker et al.
6,279,910 B1 * 8/2001 de Keller ...................... 273/292
6,311,976 B1 11/2001 Yoseloff et al.
6,364,314 B1 4/2002 Canterbury
6,364,765 B1 * 4/2002 Walker et al. ................... 463/16
6,497,408 B1 12/2002 Walker et al.
6,569,017 B2 5/2003 Enzminger et al.
6,581,935 B1 6/2003 Odom
6,599,188 B2 7/2003 Hirsch et al.
6,607,440 B2 8/2003 Santini, Jr.
6,656,040 B1 * 12/2003 Brosnan et al. ................. 463/16
6,656,045 B2 12/2003 Wei et al.
6,663,487 B1 * 12/2003 Ladner ............................ 463/13
6,692,353 B2 * 2/2004 Walker et al. ................... 463/16
6,755,739 B2 6/2004 Santini, Jr.
6,832,956 B1 12/2004 Boyd et al.
7,008,324 B1 * 3/2006 Johnson et al. ................. 463/42
8,506,386 B2 * 8/2013 Harris et al. .................... 463/25
2002/0115489 A1 8/2002 Jordan et al.
2003/0013514 A1 1/2003 Cregan et al.
2003/0032474 A1 2/2003 Kaminkow
2003/0060273 A1 3/2003 Kaminkow et al.
2003/0064798 A1 * 4/2003 Grauzer et al. ................. 463/29
2003/0085514 A1 * 5/2003 Yoseloff et al. ........... 273/143 R
2003/0087691 A1 5/2003 Kiely et al.
2003/0109308 A1 6/2003 Rowe
2003/0127793 A1 * 7/2003 Adams ....................... 273/138.2

(Continued)

*Primary Examiner* — Damon Pierce
(74) *Attorney, Agent, or Firm* — Weide & Miller, Ltd.

(57) ABSTRACT

A method of awarding wins for game play comprises determining winning outcomes from all possible outcomes of game play and assigning at least one of two different types of awards, such as either or both primary and secondary credit awards, to each winning outcome. Preferably, the winning combinations and associated awards are selected so that, when assigned to a secondary event, the outcome of the game may be represented as the outcomes of a secondary event. In one embodiment, the outcomes of a Class II game, such as bingo, are represented by outcomes Class III type event, such as the game of slots. In accordance with the invention, the representation of the game outcomes mimics the frequency of wins and the payouts associated for those wins in a true Class III game, including as dependent upon the size of a player's wager.

13 Claims, 3 Drawing Sheets

(56) References Cited

U.S. PATENT DOCUMENTS

| | | | | |
|---|---|---|---|---|
| 2003/0199320 | A1 | 10/2003 | Nguyen et al. | |
| 2004/0005926 | A1 | 1/2004 | LeFroy | |
| 2004/0142742 | A1 | 7/2004 | Schneider et al. | |
| 2004/0180714 | A1 | 9/2004 | Ward | |
| 2004/0266517 | A1 | 12/2004 | Bleich et al. | |
| 2005/0014554 | A1 * | 1/2005 | Walker et al. | 463/20 |
| 2005/0054405 | A1 * | 3/2005 | Baerlocher et al. | 463/9 |
| 2005/0054439 | A1 | 3/2005 | Rowe et al. | |
| 2005/0059467 | A1 | 3/2005 | Saffari et al. | |
| 2005/0059471 | A1 | 3/2005 | Cannon | |
| 2005/0187014 | A1 * | 8/2005 | Saffari et al. | 463/27 |
| 2006/0019744 | A1 | 1/2006 | Roemer | |

* cited by examiner

METHOD AND APPARATUS FOR AWARDING WINS FOR GAME PLAY

FIELD OF THE INVENTION

The present invention relates to game play of wager type games and, more particularly, to a method of awarding wins and displaying winning results.

BACKGROUND OF THE INVENTION

Federal laws define several types of gaming. One type is known as Class II gaming, and another is Class III gaming. While the statutory definition of Class III games does not include a specific definition of the games (the statutory definition is that Class III games are all games which are not Class I or II games), Class III games are generally recognized as being of the type commonly offered in casinos in Nevada, such as slot machines, video poker machines and the like.

According to the statutory definition, Class II gaming includes the game of chance commonly known as bingo, whether or not electronic, computer or other technologic aids are used in connection therewith. 25 U.S.C. §2703(7). In accordance with statutory definition and interpretation thereof, the game of bingo requires multiple players to cover number or other designations on a card, and at least one winner comprising the player(s) who are the first to achieve a designated cover arrangement.

Class II gaming is very important and there is a strong desire for Class II games. Among other things, the Indian Gaming Regulatory Act (25 U.S.C. §2701 et. seq.) provides that an Indian tribe may engage in Class II gaming where the state in which it is located permits similar games and such gaming is not otherwise specifically prohibited on Indian lands by Federal law. 25 U.S.C. §2710(b)(1)(A). Thus, in accordance with this Act, though Class III gaming may be prohibited in certain locations, at those same locations, Class II games may be permitted. As a result, there, it is a substantial desire to produce, and a substantial demand for, Class II games.

Of course, the definition of Class II gaming is limited, and does not, even under the above-referenced exemption, allow the offering of slot, video poker and similar Class III games which are very popular. In order to make Class II gaming more exciting, many have sought ways to display the outcome of a Class II game as an additional entertaining event, such as a simulated Class III type game event.

As one attempt to create a Class II game having an outcome displayed as an event such as a Class III type game, Class II games have been developed where the outcome of the bingo game is displayed as a slot machine outcome. Table I below details an example mapping of bingo game outcomes to slot game results.

TABLE I

| Bingo Pattern | Prize Value | Slot Display | Description |
|---|---|---|---|
| 1 | 500 | R7-R7-R7 | 3 Red Sevens |
| 2 | 250 | W7-W7-W7 | 3 White Sevens |
| 3 | 100 | A7-A7-A7 | Any 3 Red or White Sevens |
| 4 | 50 | 3B-3B-3B | 3 Triple Bars |
| 5 | 30 | 2B-2B-2B | 3 Double Bars |
| 6 | 20 | 1B-1B-1B | 3 Single Bars |
| 7 | 10 | 3 CH | 3 Cherries |
| 8 | 5 | Any 3 1B, 2B or 3B | Any 3 Single Double or Triple Bar |
| 9 | 5 | Any 2 R7 | Any 2 Red Sevens |
| 10 | 4 | Any 2 CH | Any 2 Cherries |
| 11 | 3 | Any 1 R7 | Any 1 Red Seven |
| 12 | 2 | Any 1 CH | Any 1 Cherry |

In accordance with this arrangement, if a player receives a bingo game winning outcome, such as Bingo Pattern No. 1 (this pattern might comprise, for example, a match of the number at all four corners of a player's card), then that win may be presented as a slot game in which the outcome is the display of the symbols Red 7-Red 7-Red 7. Thus, as part of the game, the gaming machine might display a video slot game in which the simulated reels stop and display the result Red 7-Red 7-Red 7. The player may be provided with a paytable indicating that this slot result has an associated payout of 500 credits. In this manner, while the player is playing a bingo game and the outcome of that game determines the actual award to which the player is entitled, the outcome of the game is actually displayed as an additional entertaining event, namely a simulated slot game.

Unfortunately, this approach has several problems. A primary problem is that this arrangement does not permit an effective representation of the Class III type event to the actual Class II game outcomes. Class III game players are familiar with the odds of receiving winning and losing results for those games, for example. In order to replicate the "feel" of the Class III game, the outcomes of the Class II game should cause winning "Class III" display results to mimic the play of a real Class III game. In other words, displaying the outcome of the Class II game as a secondary event is not as exciting to the player when the displayed results are predictable and do not emulate the actual game which is being used to display the outcome of the Class II game. Where the mapping is, as indicated above, provided on a one-to-one basis, this is problematic.

In addition, Class III games generally permit players to place wagers of different amounts, and the payouts and hit frequencies of winning results may change. For example, a player who places a two credit wager (vs. a one credit wager) may expect to receive less frequent winning results, but much higher payouts for those winnings results. The above-described mapping arrangement does not effectively provide for the simulation of this Class III game feature as the "display" of the Class II game outcome.

SUMMARY OF THE INVENTION

The invention comprises methods of playing/presenting a game, methods for determining, awarding and representing game outcomes, including wins, and apparatus for presenting and/or implementing the methods of the invention.

One embodiment of the invention is a Class II game having outcomes which are represented by Class III gaming events. In one embodiment, the Class II game is a game of bingo and slot game outcomes are utilized to represent the outcome of the bingo game.

An embodiment of the invention is a method of selecting winning outcomes for the game, providing awards for those outcomes, and then mapping the winning outcomes and/or awards to secondary events, so that display of the one or more secondary events mimics the play of a game comprising the secondary event. In one embodiment, two or more different types of awards are associated with the winning outcomes, with each winning outcome having at least one of the different types of awards associated therewith. In a preferred embodiment, the awards which are associated with each winning outcome comprise either or both of a primary award and a secondary award. The primary award may be one or more primary credits, those credits having a first value which is equal to a base wager denomination. The secondary award may be one or more secondary credits, those credits having a reduced or second value, such as a value of 1/100th of the value of a primary credit.

In one embodiment, at least one award is associated with every winning outcome, such that all players of the game play for the same winning outcomes. For example, each winning outcome may result in a payout of one or more secondary credits to every player who receives that winning outcome. The total award associated with each winning outcome may vary depending on play criteria, such as the size of a player's wager. For example, a player who places a wager of a first amount may receive only an award of secondary credits for a particular winning outcome, but a player who places a wager of a second amount (such as twice as many credits) may receive an award of both primary credits and secondary credit for receiving that same winning outcome.

In accordance with the invention, winning outcomes are paired with awards in order to achieve a payout percentage/winning outcome frequency which mimics the play of an actual Class III game, even though the outcomes of the Class III game or event are simply representative of the actual outcome of the Class II game. In this manner, a player perceives the secondary event as being a "true" event. In a preferred embodiment, the primary awards are mapped to one or more secondary outcomes or events, with the mapping chosen so that the presentation of secondary outcomes or events mimics play of an actual game of the secondary type, such as in frequency of payout and receipt of winning combinations.

The method has particular applicability to the game of bingo. In accordance with the game, two or more players place a wager to play the game. Each player is provided with at least one set of game numbers, such as numbers associated with a game card. Game numbers are selected and each player attempts to match the game numbers to their player numbers. Winning outcomes may be defined as one or more patterns of matching numbers.

Each outcome, including winning outcomes, is preferably mapped or associated with a secondary event outcome, such as a set of slot symbols. The outcome of the game is thus represented by the secondary event, such as spinning a simulated set of video reels and stopping them at position which displays the corresponding event result. The player thus perceives the outcome of the game as the secondary event outcome.

In accordance with the invention, the frequency with which the secondary event outcomes are received, and the associated payouts, mimics the actual frequency and payouts of the outcomes of an actual Class III game (or other event). Thus, though the actual results of the game are dependent upon the base game results, the player perceives the game results as one or more secondary events which mimic or emulate an actual game.

Further objects, features, and advantages of the present invention over the prior art will become apparent from the detailed description of the drawings which follows, when considered with the attached figures.

DETAILED DESCRIPTION OF THE INVENTION

The invention is a game, including a method of playing/presenting a game, methods for determining, awarding and representing game outcomes, including wins, and apparatus for presenting the methods of the invention. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a method of playing/presenting a Class II game in which the outcome of the game is, at one or more times, represented as a Class III type gaming or event, such as in the form of a slot game result. In general, all players of the Class II game play for the same set of outcomes, including the same set of winning outcomes. Each player's game characteristics, however, may vary. For example, players may place wagers of different amounts for the opportunity for different winning payouts and different winning payout frequencies. One embodiment of the invention is method of awarding payouts, such as in association with winning results and such as when the outcome is represented as one or more secondary events. In one embodiment, a plurality of different types of winning results or awards, preferably comprising either or both of a first or primary credit payout and a second or secondary credit payout, are associated with the winning outcomes. This aspect of the invention has applicability to a variety of games.

Figure 1:
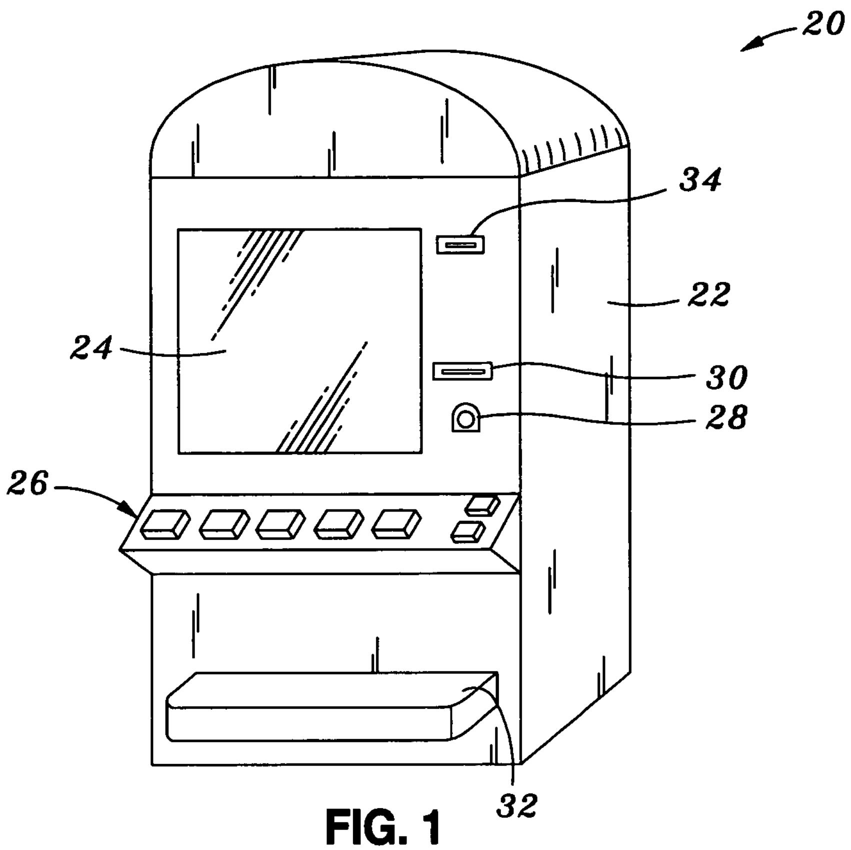
FIG. 1 illustrates a gaming machine in accordance with one embodiment of the invention.

The various methods of the invention may be presented on or by a gaming machine. The gaming machine may have a variety of configurations. One embodiment of a gaming machine is illustrated in FIG. 1.

As illustrated therein, the gaming device or machine 20 includes a housing 22 containing or supporting various components. The gaming machine or device 20 is, either alone or in combination with other devices, preferably configured to present a game, such as a game of the invention. It will be appreciated that the housing 22 may have a variety of shapes and configurations. For example, the gaming machine 20 may be configured as an "upright," "bar-top" or "slant" style gaming machine, which configurations are well known in the industry.

As illustrated, the gaming machine 20 includes means for displaying symbols or indicia utilized in the play or presentation of a game. In a preferred embodiment, the gaming machine 20 is configured as a "video" type machine, in which game information is displayed on at least one display 24. In a preferred embodiment, the display 24 is a video display. The display may be of a variety of types now known or later developed, such as DLP, CRT, plasma, LCD or others.

The gaming machine 20 preferably includes one or more player inputs which permit the player to interact with the gaming machine 20. In the embodiment illustrated, the gaming machine 20 includes a plurality of push-buttons 26. The function to which each button is linked may vary, depending at least in part upon the particular game which the machine 20 is presenting or is configured to present. For example, as described below, the buttons 26 might include a "play" button, a "bet one" button, a "bet max" button, and a "cash out" button, among others.

A wide variety of other inputs may be provided, varying both in form and function. For example, in one embodiment, the display may be configured as a "touch screen" type display. Other inputs, such as a rotatable arm, joysticks, keyboards or keypads, or other inputs may be provided. Each input preferably provides input, such as by way of an electrical signal, to the gaming controller or other game content generating device. In that manner, game play is interactive.

In one embodiment, the gaming machine 20 is configured to present a game only upon a player placing a bet, wager, or other payment. Thus, the gaming machine 20 may include means for accepting value, and preferably, monetary value. As illustrated, the gaming machine 20 may include a coin acceptor 28. The coin acceptor 28 may be configured to accept coins of one or more denominations. A coin sorter, coin hopper and other coin holding and processing devices may be located in the housing 22 of the gaming machine 20.

The gaming machine 20 may also or alternatively include a bill validator 30. The bill validator 30 may be configured to accept paper money of one or more denominations. A bill stacker and other bill processing and storage devices may be located in the housing 22 of the gaming machine 20.

The gaming machine 20 may also or alternatively include a ticket reader, smart card, credit card or other media acceptor/reader. Such devices may be utilized to obtain information regarding value, such as credit card account information or bar-coded ticket value. In one embodiment, the ticket reader may be combined with the bill validator 30.

When value is provided to the gaming machine 20, the gaming machine 20 may be configured to display information regarding the provided value, such as in the form of "credit" information. This information may be displayed, for example, on a display of the gaming machine or one associated therewith.

The player may utilize inputs to place a wager, bet or provide payment to play a game. For example, a player may depress a "bet one" or "bet max" button to bet or wager one or more credits.

In one embodiment, the gaming machine 20 is configured to award winnings for winning outcomes of games played. The winnings may be paid or provided to the player in a variety of manners. In one embodiment, awards may be indicated in the form of credits. Thus, when a player wins, the total number of credits belonging to them is increased, and the increased amount may be displayed to the player. The player may utilize the awarded credits to play future games.

In another embodiment, the player may be awarded money, or may convert credits to money. As illustrated, the gaming machine 20 may include a coin tray 32 into which coins may be dispensed. The coins may represent a specific award. Alternatively, the player may utilize a "cash out" button or input and be paid the value of their credits in the form of coins.

Other forms of payment may be provided, such as by issuance of a ticket which represents value. As illustrated, the gaming machine 20 includes a ticket printer 34 for printing and dispensing a medium bearing information regarding value.

Preferably, means are provided for controlling the operation of the gaming machine 20, such as the content displayed by the display 24. In one embodiment, that means comprises a gaming controller. The gaming controller may be configured to track game credits (including value provided to the gaming machine and bets placed), generate and/or display game symbols or indicia and determine game outcomes. In one embodiment, a gaming controller includes a processor and a memory. The memory stores software which is executed by the processor. In one embodiment, the gaming controller is located inside of the housing 22 of the gaming machine 20.

The gaming machine 20 illustrated and described is just one embodiment of a device which may be used to present a game in accordance with the invention. Other devices may be utilized. For example, the gaming machine 20 may also comprise a computing device, such as a laptop or desktop computer. Game information may be transmitted via a communication link to a remote player. The communication link may include, for example, the Internet. The game information may be utilized by the remote player's computer, such as by displaying game information on an associated screen. A player may provide input via a keyboard, mouse or other input device.

As described below, in one embodiment, the gaming machine 20 is configured to present a Class II game, and more particularly a bingo game having one or more results displayed as one or more secondary events, such as a Class III game-type event. In one embodiment, the bingo game information is displayed on the display 24, as is the Class III-type result event. For example, a result of the Class II game may be displayed as a video slot game on the display 24.

In another embodiment, the gaming machine 20 could include one or more mechanical reels comprising bodies having one or more indicia or symbols printed thereon for displaying game information. For example, those reels may be used to display the Class III type event comprising the result of the Class II game. The reels may have a number of positions or locations which bear or do not bear (i.e. comprise a "blank" position) indicia. The indicia or symbols which are borne by the reels may vary.

In such a configuration, means are provided for rotating the reels. In one or more embodiments, the means may comprise motors which are arranged to rotate and stop each reel. Such mechanisms are well known to those of skill in the art. Preferably, a controller is arranged to either turn off the signal to the device(s) effecting the rotation of each or all of the reels or generates a signal for activating a braking device, whereby the reels are stopped. The controller is arranged to stop the reels in a position displaying a combination of indicia as determined by the controller which corresponds to the outcome of the Class II game. The principal of such an arrangement is described in U.S. Pat. No. 4,448,419 to Telnaes, which is incorporated herein by reference.

In other embodiments, the gaming machine 20 may include multiple video displays or other display devices such as rotating wheels, meters and other elements for conveying information regarding one or more aspects of the game. For example, a first video display may display primary game information, while a second display may display the secondary event(s).

As indicated, in a preferred embodiment, the gaming machine 20 is configured to present a Class II game and, more particularly, a bingo-based game. As indicated, to meet certain laws/requirements, in such a configuration, multiple players must elect to participate in order to the game to be presented. In one embodiment, games are presented to multiple players by two or more associated gaming machines.

Figure 2:
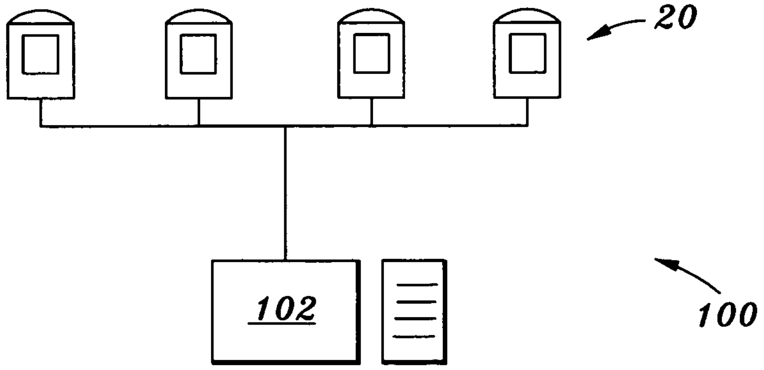
FIG. 2 illustrates a gaming system in accordance with one embodiment of the invention; the gaming system including one or more gaming machines.

Referring to FIG. 2, in one embodiment, a gaming system 100 includes at least two gaming machines 20. In one embodiment, the operation of each gaming machine 20 is controlled in whole or in part from a remote location, such as a remote server 102. For example, game data may be generated remotely and be transmitted to the gaming machine 20 for display. The game data may then be downloaded to the gaming machine 20 via a wired or wireless communication link.

In such a configuration, when a player wishes to play a game at a gaming machine, the gaming machine sends a signal to the server 102. If there are least two such signals indicating at least two players desire to play, then the server 102 may be configured to initiate the presentation of the game. In the course of presenting the game, the server 102 may create game data which is transmitted to the gaming machines 20 for use by the gaming machines 20 in presenting the game. Such a configuration of a distributed gaming system are well known.

Of course, the gaming machines and the gaming system may have a variety of other embodiments. For example, the gaming machines might comprise computing devices and the system might include a LAN, WAN, dedicated communication links, and even include the Internet. For example, the game might be presented to a plurality of user of home computing devices which communicate with a remote server via the Internet.

In one embodiment, multiple servers may communicate with one another via one or more communication links. In this manner, multiple gaming machines at a first location may be associated with multiple gaming machines at a second, remote location.

One embodiment of the invention is a method of game play including presenting a game and the results thereof. This method may be implemented on a gaming machine/system such as that described above, among other environments.

One embodiment of the invention is a game. Preferably, the game meets the definition of a Class II game. In one embodiment, the game is a multi-player game, and more particularly, the game of bingo. The multi-player game of bingo is well known and thus will not be described in great detail herein.

In accordance with the game, each player preferably places a wager to be entitled to play the game. In one embodiment, the wager comprises one or more credits. Preferably, as described below, different game outcomes, including awards, may result depending upon the size of the player's wager.

Each participating player is provided with a set of player symbols, such as numbers. In a preferred embodiment, the symbols are associated with a game card. In one embodiment, the game card is a bingo card having spaces bearing symbols such as numbers. In a gaming environment where the game is presented on an electronic gaming machine such as that described above, the game card is preferably electronically displayed.

Game numbers (or other symbols, when the cards bear other symbols) are drawn. In a preferred embodiment, the game numbers are randomly selected, such as by a random number generator (RNG) associated with a server. As is known, the object of the game is for the player to match game numbers to the numbers on their card(s) to achieve a pattern or number of matches. The numbers may be drawn or generated one at a time, or in groups or sets containing one or more numbers.

Figure 3:
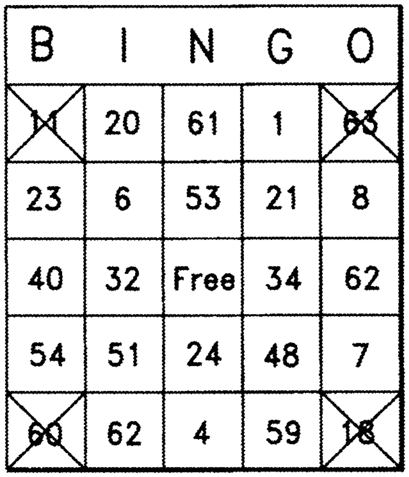
FIG. 3 illustrates one example of a winning bingo card pattern.

One or more patterns of matching numbers or symbols are designated game winning combinations. For example, a game winning patterns may be one or more of those illustrated in FIG. 3, such as "four corners," "cover-all," "a diagonal" or others.

As game numbers are drawn, the object is to match the game numbers to numbers on the game cards. In one embodiment, the game numbers are displayed to the players. For example, the game numbers may be transmitted from the server to the gaming machines and displayed on the displays thereof.

As is known, the game numbers may be selected in a variety of fashions. Of course, in a traditional manner, the numbers may be printed on balls, and the balls may be randomly drawn. In an electronic game environment such as that illustrated in FIG. 2, the numbers may be selected with a random number generator of the server 102.

In one embodiment of the game, a player is required to daub matching numbers. This may be performed manually, such as by a player touching an area of a display corresponding to the card location of a number match, or by the player instructing the gaming machine to daub all matches (such as by selection of a "daub" button) on the machine. In one embodiment, the step of daubing results in a confirmation of a match and may include the display of the match on the player's game card.

As indicated above, the object of the game is for a player to achieve a predetermined matching card pattern. In one embodiment, the game must have a winner, game numbers are selected until at least one player has achieved a predetermined winning combination.

In accordance with the invention, the result of the game are represented or displayed as one or more secondary events, and most preferably, as a Class III type game event. In one embodiment, each player's game outcome is represented as such as event, whether the outcome is a winning or losing outcome. In another embodiment, only winning outcomes might be displayed as such an event.

In one embodiment, the outcome of the game is displayed or represented as a slot-type event, i.e. has the appearance of a Class III slot game. This preferably comprises the display of a plurality of symbols. Preferably, the symbols are displayed on mechanical or video-simulated reels. As is known in the game of slots, the outcome of the game is determined by combinations of symbols which are displayed at the end of the event (such as when the reels stop rotating). In one embodiment, a plurality of symbols are displayed, but only those symbols which are positioned along "paylines" are those which define the result of the event. For example, a payline may comprise a horizontal line extending through or across three reels displaying symbols. There may be more than one payline (as described below) and the configuration of the paylines may vary (for example, they may be "V" shaped, diagonal, vertical, horizontal or other variations).

In this arrangement, the outcome of the slot event is known from the outcome of the base game, with the outcome of the game simply represented by the second event. Thus, in one embodiment, second event outcomes are mapped to outcomes of the base game. For example, if a "cover all" bingo result is designated a winning event, then that result may be represented by a slot game outcome of the symbols "7-7-7" displayed on an active payline.

One embodiment of the invention is a method for determining awards for winning outcomes and for representing outcomes as secondary events, such as the outcome of a simulated game. This aspect of the invention has particular applicability to the above-described method of game play. As described below, however, this aspect of the game may be applied to a variety of games or gaming environments.

In accordance with the invention, one or more of the potential outcomes of the bingo game are designated winning outcomes. In a preferred embodiment of the invention, an award is associated with each winning outcome. The particular award associated with each winning outcome, however, may vary. In one embodiment, the award associated with each winning outcome varies depending on one or more criteria. In a preferred embodiment, the criteria includes the size of the player's wager.

One aspect of the invention is a game in which at least two different types of awards are associated with one or more of the winning outcomes. The particular types of awards may vary depending upon criteria such as the size of the player's wager.

In one embodiment, the types of awards include, but are not limited to, awards of credits of a first or primary type, and of a second or secondary type. The primary credits may be credits of the same value or denomination as the player's wager. The secondary credits may be credits having a different value or denomination as the primary credits. In one embodiment, the secondary credits have a lesser value or denomination than the primary credit. For example, the secondary credits may have a value of 1/100th of the value of a primary credit.

As indicated, either or both types of awards are preferably associated with each winning combination. In a preferred embodiment, the award which is associated with each winning combination or outcome is selected so that the outcomes of the game may be represented as the outcome of a Class III game event, such as a game of slots, including the representative odds of receiving winning and losing combinations in such an event, and including changes in awards based upon th size of a player's wager.

An example of the method and configuration just described will be described in detail with reference to Table 2.

TABLE II

| Bingo Pattern | Secondary Credit Award | Primary Credit Award: 1 Credit Wager | Primary Credit Award: 2 Credit Wager |
|---|---|---|---|
| 1 | 100 | 200 | 400 |
| 2 | 95 | 0 | 100 |
| 3 | 90 | 0 | 0 |
| 4 | 85 | 50 | 50 |
| 5 | 80 | 0 | 20 |
| 6 | 75 | 0 | 0 |
| 7 | 70 | 10 | 10 |
| 8 | 65 | 0 | 5 |
| 9 | 60 | 0 | 0 |
| 10 | 55 | 2 | 4 |
| 11 | 50 | 0 | 2 |
| 12 | 45 | 0 | 0 |
| Must Go | 40 | 0 | 0 |

Table 2 illustrates a mapping of two types of awards to winning outcomes of the games. As illustrated, each and every player of the game plays for the same winning outcomes (bingo patterns 1-12 or "Must Go," which in one embodiment is a pattern which must be received to win the game if patterns 1-12 are not received within parameters set for those patterns, such as a winning cover before a certain maximum number of game numbers are selected). However, the awards which are associated with those winning outcomes varies, in this instance, based upon the size of the player's wager.

As illustrated, in a preferred embodiment, a winning or award is associated with and awarded to a player who receives any of the winning bingo patterns or outcomes. Preferably, however, the award which is associated with one or more of the winning outcomes varies depending upon game play criteria, such as, in this instance, the size of the player's wager.

In one embodiment, a secondary credit award is associated with each and every winning outcome, no matter the size of the player's wager. In this regard, all players are playing for the same winning combinations or outcomes, regardless of the size of their wager, since all players are awarded winnings for those outcomes, regardless of the size of their wager.

In this example, the size of the secondary credit award for each winning outcome is the same regardless of the size of the player's wager. In another embodiment, the size of the secondary credit award may vary. In one embodiment, only a primary credit award might be associated with a winning outcome (for example, no secondary credit award might be associated with Bingo Pattern 1 of Table II, since a primary credit award is associated with that winning outcome as to all types of player wagers—in other words that outcome is winning outcome as to all player by virtue of the existence of the primary credit award).

In this example, a player may also be awarded an award of primary credits, depending upon the particular winning outcome and/or the size of the player's wager. For example, if a player placed a wager of a single credit and obtained a game outcome comprising bingo card pattern 1, then the player is awarded 200 primary credits. However, if a player obtained the same winning outcome having wagered a larger wager, such as two credits, then the player is awarded 400 primary credits. On the other hand, if the player had received bingo card pattern 2 and placed only a single credit wager, they would have been awarded no primary credits. If the player had placed a two credit wager, they would have been awarded 100 primary credits.

As illustrated, the winning outcome in each instance is still preferably represented by a secondary event comprising a slot game. Thus, each outcome of the game preferably corresponds to a representative secondary event outcome. For example, with reference to Table II, the payout or award of 200 primary credits (for a 1 credit wager when bingo pattern 1 is received) might be represented as the set of slot symbols 7-7-7 on a payline. The payout or award of 400 credits (for a 2 credit wager when bingo pattern 2 is received) might be represented as the slot symbols Cherry-Cherry-Cherry on a payline.

Preferably, the number of winning bingo patterns, the primary and secondary credit awards, and the associated event representations, are selected so that the outcomes of the bingo game may be realistically represented as a Class III game or event, such as a game of slots. As described below, in one embodiment, the selection of the awards, and preferably the selection of the primary credit awards, is arranged, relative to the secondary events, so that the presentation of the secondary events mimics the actual play, including frequency of receiving secondary event outcomes which represent winning outcomes, and payouts, which mimic an actual game.

Figure 4:
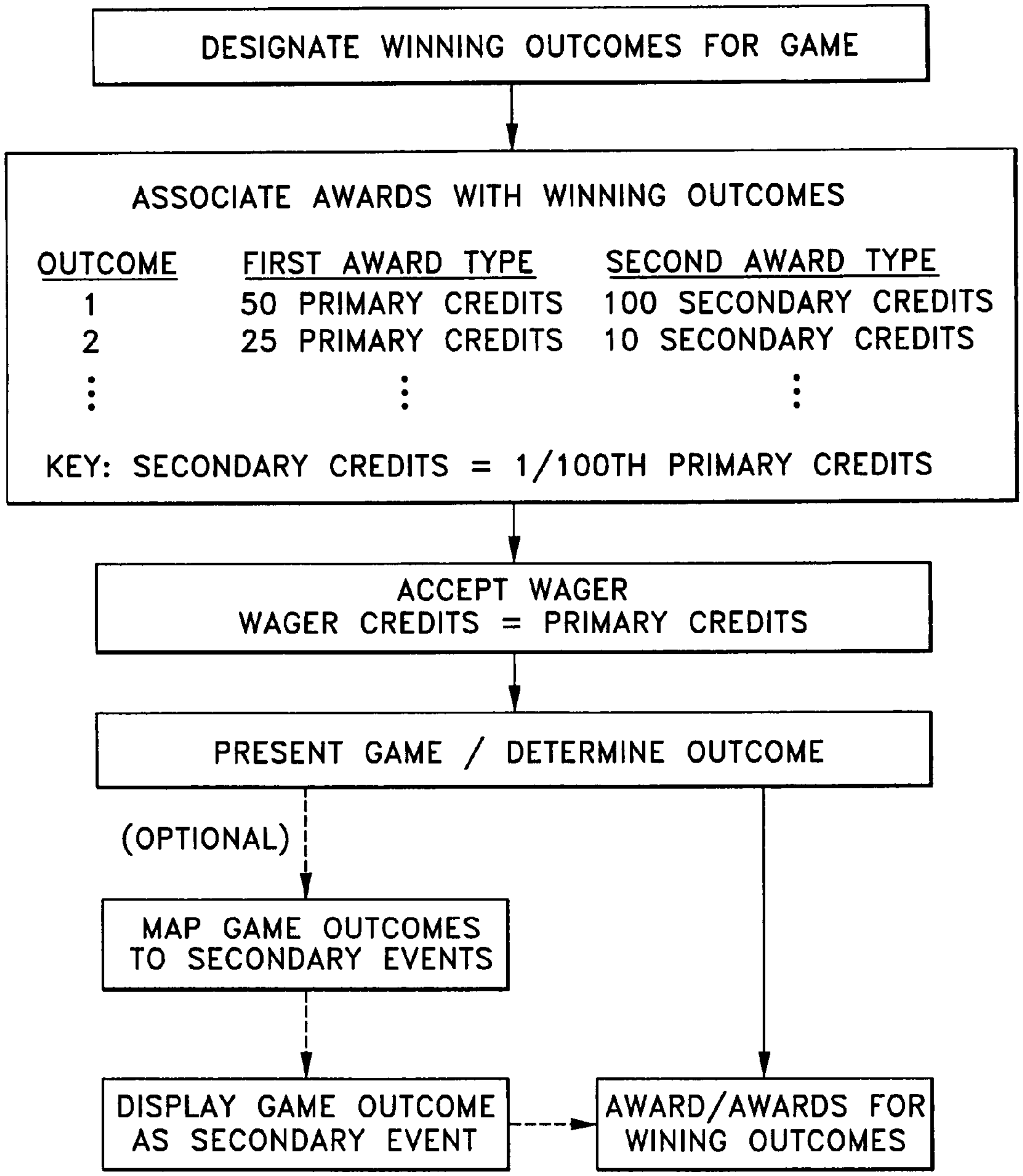
FIG. 4 is a flow diagram illustrating a method in accordance with an embodiment of the invention.

One example of a method of implementing the above-described aspect of the invention will now be described, in part with reference to FIG. 4. First, a set of bingo patterns are selected as winning outcomes. The number of patterns selected is large enough to create various prize value/odds pairings necessary to allow the secondary event to be accurately reflected. It will be appreciated that the winning outcomes may be selected from a set of possible outcomes for the game.

Next, a secondary credit value is assigned to one or more, and preferably each, winning outcome. This permits calculation of a baseline payout for the game. In a preferred embodiment, the baseline payout resulting from secondary credit payouts is fairly low, such as <1% of the total prize payout. This allows the majority of the prize payout to be in the form of primary credits.

A set of primary credit awards, including their values, are selected. As indicated, the primary credit award may have a value of 0.

Winning bingo patterns are selected from the set of winning patterns and are paired with one or more primary credit awards in order to achieve the payout percentage/hit frequency requirement for that value of award in the paytable of the secondary event which represents the outcome of the game. The combinations of all selected individual patterns and prize values are selected so that the overall frequency of winning outcomes and the payout percentage of the game is known. If a winning outcome was not assigned a secondary credit award, then it is preferably ensured that a primary credit award is associated therewith, so that each winning outcome results in some type of award. It is noted that the combination of types of awards, such as primary and/or secondary credit values, may both vary based upon a player's wager (for example, as to one winning bingo pattern, a player placing a 1 credit wager might receive 10 secondary credits, while a player placing a 2 credit wager might receive 20 secondary credits and 20 primary credits).

In a preferred embodiment of the invention, the primary credit values or awards for winning game outcomes are mapped to one or more secondary event outcomes. This mapping is selected so that the various secondary events which represent the game outcome, have results which mimic or emulate a true game or event. For example, a non-winning game result providing a zero credit payout may be mapped to a normal non-winning result in the game of slots, such as Blank-Bar-Blank. A winning game outcome having a 10 credit payout may be mapped to one or more outcomes of a game of slots which have the same frequency of occurrence and have similar payouts, such as Blank-Cherry-Blank. Larger winning game outcome payouts may be mapped to slot game outcomes which have a low frequency and traditionally higher payout. Preferably, of course, the various outcomes/payouts are mapped to the various secondary events or outcome displays so that the frequency of wins and associated payouts mimics the secondary event as if it were an actual game or true event.

The secondary credits may be similarly mapped to (or with) the primary credits. In another embodiment, when the secondary credit awards are provided for all winning outcomes, they may simply be awarded, such as by incrementing the credit meter.

One example will now be illustrated. This example assumes a simple game in which 12 bingo patterns have been selected as winning combinations. The table below shows the hit frequency for the bingo patterns and the resulting odds. The minimum number of players required to play the game is 2. The monetary value assigned to a secondary credit is 1/100th of a primary credit.

TABLE III

| | | |
|---|---|---|
| Secondary Unit | 0.01 | |
| per Primary Credit | 100 | |
| Minimum Players | 2 | |
| **Bingo Pattern** | **Frequency** | **Odds** |
| 1 | 0.001 | 1000 |
| 2 | 0.001 | 1000 |
| 3 | 0.001 | 1000 |
| 4 | 0.005 | 200 |
| 5 | 0.005 | 200 |
| 6 | 0.005 | 200 |
| 7 | 0.02 | 50 |
| 8 | 0.02 | 50 |

TABLE III-continued

| | | |
|---|---|---|
| 9 | 0.02 | 50 |
| 10 | 0.1 | 10 |
| 11 | 0.1 | 10 |
| 12 | 0.1 | 10 |
| MustGo | 0.311 | 3.2154 |
| Total Game Hit Freq | 0.378 | |
| Spins/Prize Pay | 2.65 | |

In Table IV, 4 of the winning bingo patterns are additionally assigned additional primary credit awards. The resulting hit frequency (1 in 7.94 spins) and percentage of prize payout (85%) of the primary credit prizes is similar to 1 line in play on a 3 reel 3 line slot display.

TABLE IV

| | Payline1 | Credits | 1 | |
|---|---|---|---|---|
| **Bingo** | **Credit Pay** | **Prize** | **Reward Cont** | **Hit Freq** |
| 1 | 200 | 0.2 | 0.00001 | 0.001 |
| 2 | 0 | 0 | 0.00001 | 0 |
| 3 | 0 | 0 | 0.00001 | 0 |
| 4 | 50 | 0.25 | 0.00005 | 0.005 |
| 5 | 0 | 0 | 0.00005 | 0 |
| 6 | 0 | 0 | 0.00005 | 0 |
| 7 | 10 | 0.2 | 0.0002 | 0.02 |
| 8 | 0 | 0 | 0.0002 | 0 |
| 9 | 0 | 0 | 0.0002 | 0 |
| 10 | 2 | 0.2 | 0.001 | 0.1 |
| 11 | 0 | 0 | 0.001 | 0 |
| 12 | 0 | 0 | 0.001 | 0 |
| MustGo | 0 | 0 | 0.00311 | 0 |
| | Totals | 85.0% | 0.69% | 0.126 |
| | Net Payout | 85.7% | Spins/ReelPay | 7.94 |

In accordance with Table V, 8 of the winning bingo patterns have been assigned additional primary credit awards. The resulting hit frequency (1 in 3.97 spins) and percentage of prize payout (87.5%) of the primary credit awards is similar to 2 lines in play on a 3 reel 3 line slot display. The higher payout percentage would be represented by additional payout features that resulted when the player elected to play the second line on the slot display (at a higher resulting wager of 2 credits).

TABLE V

| | Payline2 | Credits | 2 | |
|---|---|---|---|---|
| **Bingo** | **Pays** | **Prize** | **Reward Cont** | **Reel Hit** |
| 1 | 400 | 0.2 | 0.00001 | 0.001 |
| 2 | 100 | 0.05 | 0.00001 | 0.001 |
| 3 | 0 | 0 | 0.00001 | 0 |
| 4 | 50 | 0.125 | 0.00005 | 0.005 |
| 5 | 20 | 0.05 | 0.00005 | 0.005 |
| 6 | 0 | 0 | 0.00005 | 0 |
| 7 | 10 | 0.1 | 0.0002 | 0.02 |
| 8 | 5 | 0.05 | 0.0002 | 0.02 |
| 9 | 0 | 0 | 0.0002 | 0 |
| 10 | 4 | 0.2 | 0.001 | 0.1 |
| 11 | 2 | 0.1 | 0.001 | 0.1 |
| 12 | 0 | 0 | 0.001 | 0 |
| MustGo | 0 | 0 | 0.00311 | 0 |
| | Totals | 87.50% | 0.69% | 0.252 |
| | Net Payout | 88.2% | Spins/ReelPay | 3.97 |

In Table VI, all 12 of the winning bingo patterns have been assigned additional primary credit awards. The resulting hit frequency (1 in 2.65 spins) and percentage of prize payout (89.0%) of the primary credit awards is similar to 3 lines in play on a 3 reel 3 line slot display. The higher payout percentage would be represented by additional payout features that resulted when the player elected to play the second line on the slot display (at a higher resulting wager of 3 credits).

TABLE VI

| | Payline3 | Credits | 3 | |
|---|---|---|---|---|
| Bingo | Pays | Prize | Reward Cont | Reel Hit |
| 1 | 500 | 0.166666 | 0.00001 | 0.001 |
| 2 | 250 | 0.083333 | 0.00001 | 0.001 |
| 3 | 100 | 0.033333 | 0.00001 | 0.001 |
| 4 | 50 | 0.083333 | 0.00005 | 0.005 |
| 5 | 30 | 0.05 | 0.00005 | 0.005 |
| 6 | 20 | 0.033333 | 0.00005 | 0.005 |
| 7 | 10 | 0.066666 | 0.0002 | 0.02 |
| 8 | 5 | 0.033333 | 0.0002 | 0.02 |
| 9 | 5 | 0.033333 | 0.0002 | 0.02 |
| 10 | 4 | 0.133333 | 0.001 | 0.1 |
| 11 | 3 | 0.1 | 0.001 | 0.1 |
| 12 | 2 | 0.066666 | 0.001 | 0.1 |
| MustGo | 0 | 0 | 0.00311 | 0 |
| | Totals | 0.883 | 0.0069 | 0.378 |
| | Net | 89.0% | Spins/ReelPay | 2.65 |

It will thus be understood how winning bingo patterns and their associated awards are selected so correspond to secondary event outcomes which mimic the outcomes of a true Class III type game, such as a game of slots. In other words, a Class III type game, such as the game of slots, can be effectively modeled, when considering the normal winning and losing outcomes and payout for winning outcomes, for that games, from the outcomes of a different game (such as a Class II bingo game).

In one embodiment, the award is displayed to the player. For example, the number of secondary and, if awarded, primary credits, which a player is awarded are preferably displayed via a credit count or other display.

As indicated, the primary and/or secondary credits or other awards may have various characteristics. For example, both the primary and secondary credits may have associated monetary value, such as by being equivalent to a denomination of wager/credit, or portion thereof. For example, on a gaming machine where the base wager is $0.25, each primary credit may represent a first value of $0.25. In an embodiment where the secondary credits represent a portion of the value of a primary credit, each secondary credit might represent a second value of $0.0025.

In one embodiment, secondary credits might accrue until they reach a value of a primary credit or other value. For example, once a player accrues 100 secondary credits, those credits might be turned into a single primary credit which the player can then wager or cash out.

In one embodiment, the secondary credit accrual might be displayed as a running numerical total. Displays, such as graphs or other entertaining displays such as a thermometer, filling bucket or the like might be used to graphically display the accruing secondary credits.

In one embodiment, secondary credits which can not be "cashed out" may remain associated with the gaming machine and be usable by the next player of the gaming machine.

In one embodiment, the secondary credits might have other values. For example, the secondary credits might comprise points or represent points. A player might use the points to obtain complimentary awards. For example, a player might win 1500 secondary credits. The player might obtain a ticket for those credits from the machine (such as via the ticket printer 34 of the machine 20 illustrated in FIG. 1), or those credits might be associated with a player club account. The player might then use those credits in order to obtain free or discounted meals, lodging or the like. In fact, the primary, secondary or any of the awards or winnings may be associated with a variety of types of media, such as cards, tickets or the like. They might also be virtually represented, such as with a credit meter, and be stored as data on the gaming network.

In one embodiment, certain of the awards, such as the secondary credits, may be used to participate in other events. For example, if a player accrues a certain number of secondary credits, the player may utilize those credits to participate in an additional event, such as a bonus game.

In one embodiment of the invention, the game may include one or more progressive awards. In such an arrangement, an amount of primary and/or secondary credits may be accrued. In one embodiment, the number of primary and/or secondary credits comprising the progressive award may be incremented based upon the number and/or size of player wagers to play the game. A variety of criteria may be applied for determining the winner of the progressive award. For example, a player who receives a particular winning game outcome may win the award. In one embodiment, a player who receives a particular winning game outcome, such as a particular bingo pattern, and has accrued a certain minimum number of secondary credits, may be eligible to win the progressive award.

In one embodiment, more than two different types of awards may be associated with the various winning outcomes. For example, first, second and third types of awards might be associated with the various winning outcomes. Preferably, at least one award is associated with each winning outcome as to all players of the game. Other awards may be associated with the winning outcomes to differentiate the awards as to various play characteristics, such as the size of the player's wager. Each of the awards may have different characteristics, such as different values.

The game of the invention has particular applicability to presentation of a Class II bingo game, and representation of the outcomes thereof as a Class III gaming event, and more particularly, a slot game event. Various aspects of the invention may have applicability to other games and events. For example, the method of the invention allows for the simulation of games of blackjack, video poker, keno, roulette, craps and other types of wagering game, from outcomes of base games. The base games preferably comprise Class II games, such as the game of bingo, pull-tabs or lottery events, but may comprise other games or events.

It is known that the nature of a Class II game such as a game of bingo is that the varying number of game numbers (such as associated with balls) or variations in player count can influence the frequency with which winning outcomes are received. The present invention permits primary credits (which comprise the majority of the awarded win value) to be mapped to or associated with those patterns which are least influenced by player count or game number variation. The remaining winning outcomes can then be assigned secondary credit awards. Since the secondary credits may only represent a small fraction of the overall game payout, such variation then have little affect upon the payout outcome of the game.

A variety of advantages and features of the invention will now be appreciated. In accordance with the invention all players of a game play for the same winning outcomes, regardless of the size of their wager. In this regard, an award or winning is associated with each an every winning outcome.

However, the particular award which is associated with each winning outcome is preferably varied depending upon game play criteria such as the size of the player's wager. As indicated, the various outcomes and their associated awards are selected and mapped to secondary event outcomes so that when the outcome of the game is represented by the secondary events, the secondary events have probabilities of occurring which mimic those of an actual game.

In accordance with the invention, primary and secondary credit awards (or one or more other types of awards) are associated with the winning outcomes of the game. The secondary credit awards are associated with each winning outcome. However, the value of the secondary credits is reduced. In this manner, a baseline winning payout for the game remains very low. On the other hand, primary credits are used to distribute the bulk of the total game winnings. In this manner, the primary credits can be effectively used to control total payout percentages for the game and limit the majority of payment to certain outcomes, including outcomes which especially reward a player placing a larger wager.

It will be appreciated that various aspects of the invention have applicability to other types of games. For example, the method of the invention whereby multiple types of awards are associated with the outcomes of the game, may be applied to Class III games. For example, in a video poker game, all players may receive an award of secondary credits for winning outcomes. However, depending upon the size of the player's wager, a player may also receive a primary credit award for a particular winning outcome.

One advantage and aspect of the invention is the awarding of secondary or other awards which may be used to entice game play and build player loyalty. For example, in the method of game play described above, a player is rewarded secondary credits for their game play. As indicated, those credits may accrue, and even be saved. In such a configuration, players are enticed to play a plurality of games to accrue sufficient numbers of secondary credits to obtain an award.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of presenting a game comprising the steps of:

designating a plurality of winning outcomes for said game from a plurality of potential outcomes for said game;

associating an award with each winning outcome, said each award comprising at least a first award type and in one or more cases, a second award type, the award associated with each winning outcome varying depending upon a size of a wager placed by a player to play said game, wherein said wager is placed in one or more primary credits, each primary credit having a first value and wherein said first award type comprises a number of said primary credits and wherein said second award type comprises one or more secondary credits, each secondary credit having a second value, said second value being a fraction of said first value;

accepting a wager in credits of said first value from each of at least two players to participate in an instance of the same game;

presenting said same instance of said game to said at least two players, each player attempting to obtain a winning outcome for said game; and awarding to a player receiving a winning outcome said award associated therewith, said award comprising credits of said second value and/or credits of said first value.

2. The method in accordance with claim 1 wherein said second value has a fractional value of 1/100th said first value.

3. The method in accordance with claim 1 wherein said game comprises a game of bingo, and said step of presenting said game to said at least two players comprises generating game numbers and determining if said game numbers match player numbers.

4. The method in accordance with claim 3 wherein said player numbers are associated with game cards assigned to each player.

5. The method in accordance with claim 1 including the step of displaying the outcome of said game as to each player as a secondary event.

6. The method in accordance with claim 5 wherein said secondary event comprises a simulated game of slots.

7. The method in accordance with claim 6 wherein said simulated game of slots comprises generating video images of one or more reels bearing symbols and displaying a stopped position of said reels displaying symbols comprising the result of said simulated game.

8. A method of presenting a game comprising the steps of:

designating a plurality of winning outcomes for said game from a plurality of potential outcomes for said game;

accepting a wager in credits of a first value from each of at least two players to play said game;

determining said outcome of said game presented to said at least two players;

displaying information regarding said outcome of said game;

displaying said outcome of said game as a secondary event having attributes different than said game; and awarding an award associated with each winning outcome, each award comprising at least a first award type and in one or more cases, a second award type, the award associated with each winning outcome varying depending upon a size of a wager placed by a player to play said game, wherein said first award type comprises a number of said primary credits, each primary credit having said first value and wherein said second award type comprises one or more secondary credits, each secondary credit having a second value, said second value being a fraction of said first value, wherein said awards are selected to achieve a payout percentage and hit frequency which mimics play of said secondary event as a stand-alone game.

9. The method in accordance with claim 8 wherein said game presented to said at least two players comprises a bingo game and said secondary event comprises the display of slot game symbols.

10. The method in accordance with claim 9 wherein said secondary event comprises a slot-type event.

11. The method in accordance with claim 8 wherein said second value is 1/100th said first value.

12. The method in accordance with claim 8 wherein outcomes of said game are mapped to secondary event outcomes and said step of displaying said outcome of said game comprises displaying a corresponding secondary event outcome for said outcome of said game.

13. A method of presenting a game comprising the steps of:

designating a plurality of winning outcomes for said game from a plurality of potential outcomes for said game;

associating an award with each winning outcome, each of said awards having a total value which is represented by a predetermined number of primary credits, each primary credit having a first value, and in addition, in one or more cases, a predetermined number of secondary credits, each secondary credit having a value which is a fraction of the value of each primary credit, wherein said wager is placed in one or more primary credits;

accepting a wager in credits of said first value from each of at least two players to participate in an instance of the same game;

presenting said same instance of said game to said at least two players, each player attempting to obtain a winning outcome for said game; and awarding to a player receiving a winning outcome said award associated therewith, said award comprising credits of said second value and/or credits of said first value.

* * * * *